United States Patent
Falk et al.

(10) Patent No.: US 11,764,975 B2
(45) Date of Patent: Sep. 19, 2023

(54) METHOD FOR VALIDATING A DIGITAL USER CERTIFICATE

(71) Applicant: Siemens Aktiengesellschaft, Munich (DE)

(72) Inventors: Rainer Falk, Poing (DE); Steffen Fries, Baldham (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/421,028

(22) PCT Filed: Dec. 11, 2019

(86) PCT No.: PCT/EP2019/084660
§ 371 (c)(1),
(2) Date: Jul. 7, 2021

(87) PCT Pub. No.: WO2020/143982
PCT Pub. Date: Jul. 16, 2020

(65) Prior Publication Data
US 2022/0045868 A1  Feb. 10, 2022

(30) Foreign Application Priority Data
Jan. 10, 2019 (EP) ..................... 19151115

(51) Int. Cl.
*H04L 29/06* (2006.01)
*H04L 9/32* (2006.01)

(52) U.S. Cl.
CPC .......... *H04L 9/3263* (2013.01); *H04L 9/3247* (2013.01)

(58) Field of Classification Search
CPC ..... H04L 9/3263; H04L 9/3247; H04L 9/085; H04L 9/30; H04L 9/3268; H04L 9/006; G06F 21/602
See application file for complete search history.

(56) References Cited

U.S. PATENT DOCUMENTS 11,133,943 B2 *  9/2021  Ruckriemen ............. H04L 9/30
2005/0262345 A1 * 11/2005  Moreau .................. H04L 9/3263
                                                        713/173
(Continued)

FOREIGN PATENT DOCUMENTS

CN        1437375 A        8/2003
CN      101124765 B  *     8/2013 ........... H04L 9/3265
(Continued)

OTHER PUBLICATIONS

Request for comments RFC 5055, Dec. 2007 Internet: https://www.rfc-editor.org/search/rfc_search_detail.php?rfc=5055&pubstatus%5B%5D=Any&pub_date_type=any retrieved Aug. 1, 2018.
(Continued)

*Primary Examiner* — Joseph P Hirl
*Assistant Examiner* — Leynna Truvan
(74) *Attorney, Agent, or Firm* — Schmeiser, Olsen & Watts LLP (57) ABSTRACT

A method for validating a digital user certificate of a user by a checking device is provided. The user certificate is protected by a digital signature with an issuer key of an issuance location which issues the user certificate. The method has the steps of: receiving the user certificate in the checking device, checking the user certificate using a certificate path positive list with at least one valid certificate path which is provided to the checking device by at least one positive path server, and confirming the validity of the user certificate if the issuer key of the user certificate can be traced back to a root certificate according to one of the valid certificate paths of the certificate path positive list. Also provided is a system, a checking device, a user device, a positive path server, and a computer program product which are designed to carry out the method for validating a digital user certificate.

15 Claims, 4 Drawing Sheets

(56) References Cited

U.S. PATENT DOCUMENTS

| | | | | |
|---|---|---|---|---|
| 2010/0138652 A1* | 6/2010 | Sela | ................... | G06F 21/805 |
| | | | | 713/158 |
| 2011/0087882 A1 | 4/2011 | Kuo et al. | | |
| 2017/0288880 A1 | 10/2017 | Brockhaus et al. | | |

FOREIGN PATENT DOCUMENTS

| | | | | |
|---|---|---|---|---|
| CN | 106972931 A | * | 7/2017 | ........... H04L 9/3265 |
| EP | 3226464 A1 | | 10/2017 | |
| JP | 2011160361 A | * | 8/2011 | |

OTHER PUBLICATIONS

"Information technology—Open Systems Interconnection—The Directory: Public-key and attribute certificate frameworks; X.509 (Oct. 2019)", ITU-T Standard X.509, International Telecommunication Union, No. X.509 (Oct. 2019), pp. 1-236, XP044279483, URL: http://mirror.itu.int/dms/pay/itu-t/rec/x/T-REC-X.509-201910-I!!PDF-E.pdf; 2019.

Falk Rainer et al: "Using Managed Certificate Whitelisting as a Basis for Internet of Things Security in Industrial Automation Applications", International Journal on Advances in Security, vol. 8, No. 1 & 2, pp. 89-98, XP055398447, Gefunden im Internet: URL:https://www.iariajournals.org/security/sec v8 n12 2015 paged. pdf#page=97, [gefunden am Aug. 14, 2017]; the whole documet; 2015.

PCT International Search Report dated Mar. 2, 2020 corresponding to PCT International Application No. PCT/EP2019/084660 filed Nov. 12, 2019.

* cited by examiner

METHOD FOR VALIDATING A DIGITAL USER CERTIFICATE

CROSS-REFERENCE TO RELATED APPLICATIONS

This application claims priority to PCT Application No. PCT/EP2019/084660, having a filing date of Dec. 11, 2019, which is based on EP Application No. 19151115.3, having a filing date of Jan. 10, 2019, the entire contents both of which are hereby incorporated by reference.

FIELD OF TECHNOLOGY

A method for validating a digital user certificate of a user by a checking apparatus, wherein the user certificate is protected by a signature using an issuer key of an issuing authority issuing the user certificate, and a system, a checking apparatus, a user apparatus, a positive path server and a computer program product that are designed to carry out the method.

BACKGROUND

An asymmetric cryptosystem, for example a public key infrastructure (PKI), allows a digital certificate to be used to check the genuineness or the identity of a device. Such a certificate is normally referred to as a device certificate. A digital certificate can additionally be used to authenticate a communication partner and/or to encrypt exchanged messages. As such, messages in a network can be digitally signed and/or encrypted. A sender of the message requires the public key of the recipient for encrypted transmission. The sender normally receives this public key via a digital certificate of the recipient that contains details relating to the identity of the recipient, its permissible scope of application and validity and the public key of the recipient. The digital certificate itself is protected by a digital signature, the genuineness of which can be examined using the public key of the issuer of the certificate.

In order to examine the authenticity of the issuer key, a digital certificate is again required. In this way, it is possible for a chain of digital certificates to be set up that each confirm the integrity and authenticity of the public key that can be used to check the preceding certificate. Such a chain of certificates is subsequently referred to as a certificate path. The communication partners without a further certificate must be able to rely on the genuineness of the last certificate, which is referred to as the root certificate. When examining the authenticity of a certificate, it is therefore necessary not only to examine the certificate per se but also to verify the path of the certificate as far as the root certificate, which the checker must already have available. This is also referred to as certificate path validation.

The certificate path, that is to say a chain of certificates each confirming the signature of the preceding certificate, can be formed in the checker in different ways. As such, security protocols are known, such as for example the transport layer security protocol, that involve the complete certificate path being sent too as part of the message exchange. This is disadvantageous in particular for devices in the Internet of Things, which are battery-operated and/or connected by way of narrowband connections, for example. Additionally, this approach is supported only by specific protocols. Alternatively, the checker itself can also compile the certificate chain as far as the root certificate. This simply requires the certificates in the possible certificate chains to be available in the checker, or to be ascertained by way of a query in a certificate database. This is again not always the case, or disadvantageous for devices having a simple structure. Additionally, the case may arise in which devices that are operated in a separate subnetwork, for example of an industrial automation system, cannot contact a public certificate database.

The document US 2011/087882 A1 describes a method for automatically providing certificates in accordance with a public key infrastructure (PKI) to new devices within an organization. After a device has received a device certificate and has been accepted in the network, the device certificate is included in a positive list. An authenticator of the organization can subsequently authenticate the device directly on the basis of the positive list. Authentication on the basis of a certificate chain is no longer necessary.

The document Rainer Falk et al: "Using Managed Certificate Whitelisting as a Basis for Internet of Things Security in Industrial Automation Applications", International Journal on Advances in Security, vol. 8, Nos 1 & 2, Jun. 30, 2015 (2015 Jun. 30), pages 89-98, describes the use of certificate positive lists in industrial automation applications. A certificate is successfully validated if the certificate is contained in a certificate positive list, right-hand column. A check on the signature of the certificate is carried out for example on the basis of a set of trusted root certificates from the certification authorities.

Document EP 3 226 464 A1 describes a data structure for use as a positive list that comprises at least one entry, for example a value of a predetermined certificate field, for every permitted communication partner of the device.

In the event of a certificate in the certificate path being compromised, the checker is additionally supposed to be able to easily establish whether a received certificate is affected thereby.

The realization of certificate validation is therefore complex and susceptible to error.

SUMMARY

An aspect relates to improving the validation of a digital certificate in regard to susceptibility to error and complexity.

According to a first aspect, embodiments of the invention relate to a method for validating a digital user certificate of a user by a checking apparatus, wherein the user certificate is protected by a signature using an issuer key of an issuing authority issuing the user certificate, and a certificate path is a chain of certificates each confirming the signature of the preceding certificate, comprising the method steps of:
  receiving the user certificate in the checking apparatus,
  checking the user certificate on the basis of a certificate path positive list, containing at least one valid certificate path, that is provided to the checking apparatus by at least one positive path server, and
  confirming the validity of the user certificate if the issuer key of the user certificate is traceable to a root certificate on the basis of one of the valid certificate paths on the certificate path positive list.

The expressions "user" and "user apparatus" are used as synonyms in this document. User or user apparatus denotes the unit for which the digital user certificate was issued or that is entered in the user certificate as owner or "subject". Checking apparatus refers to the apparatus that checks the user certificate for validity. When a user certificate is used for setting up a communication connection, a first communication partner, comprising an application protocol that transmits its user certificate to the second communication partner for authentication during authentication using a network protocol, is referred to as a user. The second communication partner is referred to as a checking apparatus. However, a user can also be a device itself that transmits or provides its authenticity for a plagiarism examination on a checking unit, for example. However, a user can also be, for example, the user of a chip card that comprises a digital certificate and the corresponding private key for authentication or access control. In such a case, the checking apparatus is accordingly an access control server or authentication server.

The checking apparatus can therefore easily ascertain the validity of the signature of the user certificate. The user certificate is then deemed valid if the issuer key can be traced to a root certificate through the chain of certificates in a certificate path from the certificate path positive list. The validation of certificate paths is therefore less susceptible to error, editable and allows specific control by way of permissible certificate paths. As a result, it is advantageous in particular for security-critical industrial automation systems. Additionally, the method can be carried out efficiently on devices having low computing power.

In one advantageous embodiment, the certificate path positive list is protected against unauthorized changes by a cryptographic function.

This hampers manipulation of the certificate path positive list or allows manipulation to be reliably detected. The certificate path positive list is stored on the positive path server in digitally signed form, for example, and/or is transmitted from the positive path server to the checking apparatus by way of a cryptographically protected communication connection that for example by way of a transport layer security protocol (TLS). The transfer can also be confirmed as a transaction by way of a block of a blockchain of a distributed database system.

In one advantageous embodiment, the certificate path positive list is updated on the basis of predefined criteria and provided to the checking apparatus by the at least one positive path server.

It is therefore possible for example for certificate paths that are permissible at a specific time or at present to be included in the certificate path positive list and forwarded to the checking apparatus. As such, for example the certificate path positive list can be updated and provided for different predefined criteria such as for example at stipulated times or periodically, such as weekly, daily, monthly or annually. Further criteria are, for example, after a predefined number of certificates have been issued, for example after 100 000 issued certificates, when a certificate or a predefined number of certificates is revoked, when the certificate from the issuing authority or a certificate from at least one of the issuing authorities that are superordinate to the issuing authority on the path to the root certificate has been revoked, changed or renewed.

Optionally, it is also possible to publish, that is to say to provide to the checking apparatus, a negative list of unapproved, closed certificate paths. This allows complete certificate groups to be decommissioned if specific certificate paths are no longer regarded as valid. For example, specific certificate paths required for testing or startup of users can be declared invalid following the conclusion of startup and therefore withdrawn.

In one advantageous embodiment, at least one positive path server receives the certificate positive lists containing valid certificate paths for the certificates issued by the issuing authority.

The issuing authority itself can therefore transmit valid certificate paths to the positive path server. The positive path server publishes the valid certificate paths in the form of an updated certificate path positive list, for example. Besides the issuing authority issuing the user certificate, issuing authorities that are superordinate to the issuing authority can also transmit valid certificate paths for the root certificate to the positive path server and publish them by way of the positive path server. The positive path server can replace the previous certificate paths or parts of certificate paths in certificate path positive lists with the transmitted certificate paths.

In one advantageous embodiment, the at least one positive path server requests the certificate paths that are valid for user certificates of the user and generates the certificate path positive list comprising the valid certificate paths.

This has the advantage that the positive path server can "learn" a certificate path positive list specifically for certain user certificates. As such, for example during startup or maintenance of a user or often of a multiplicity of users, the valid certificate paths of precisely these users are ascertained by the positive path server and for example made available to a device that is used for the maintenance. The positive path server can request the valid certificate paths from the issuing authority for the user certificates or from a superordinate configuration server, for example.

In one advantageous embodiment, a valid certificate path comprises all certificates beginning with a certificate from the issuing authority or all certificates beginning with one from an issuing authority that is superordinate to the issuing authority, up to and including a root certificate.

This has the advantage that, in the first case mentioned, at least one complete certificate path that is deemed valid is provided for each user certificate. In the latter option, in which the certificate path contains all certificates beginning only with the one from an issuing authority that is superordinate to the issuing authority, the certificate path is independent of a specific user certificate. The validity of a user certificate can therefore be predefined as a guideline or policy on the basis of a specific certificate path.

In one advantageous embodiment, the certificate path positive list comprises constraints for the use of the at least one valid certificate path.

It is therefore possible for further use options in the form of constraints to be checked when checking the validity of the certificate path, and therefore to be implemented as a guideline for use of the certificate paths.

In one advantageous embodiment, the certificate path positive list is provided to the checking apparatus by a transmission service or a transaction of a blockchain of a distributed database. A blockchain can also be referred to as a distributed ledger.

This ensures that only valid and unmanipulated certificate path positive lists are available in the checking apparatuses. A transmission service is a service or an application program that is provided by a server of a service provider, for example, and is accessible to the user and/or the checking apparatus via the public Internet, for example.

In one advantageous embodiment, the certificate path positive list is inserted into the user certificate by the issuing authority when the user certificate is issued.

This has the advantage that the user certificate itself comprises information about the valid certificate paths, and therefore a separate certificate path positive list does not need to be stored in the checking apparatus.

In one advantageous embodiment, the certificate path positive list is introduced into the user certificate as a certificate extension.

This has the advantage that the associated certificate path positive list is provided together with a user certificate. As a result, a certificate path positive list can be transmitted from one subscriber to another subscriber without a change of protocol in the case of protocols that transmit just one user certificate.

In one advantageous embodiment, a certificate path is introduced into the certificate path positive list in compressed form.

This has the advantage that the certificate path positive list can be designed in a manner optimized for memory space. As such, for example at least one certificate in a certificate path can be represented by the hash value thereof. A certificate path therefore merely comprises a sequence of hash values of all or some of the certificates in the certificate path. One or more certificates in a certificate path can also be represented by a serial number and the issuer of the respective certificate, however.

In one advantageous embodiment, a piece of reference information about the certificate path positive list is introduced into the user certificate. The reference information can in particular be a hash value of the certificate path positive list, a uniform resource identifier (URI) or a unified resource locator (URL).

This has the advantage that the certificate path positive list is optimized for memory space and for example the reference information can be resolved by way of the issuing authority. The certificate path can therefore be updated very flexibly in the issuing authority without communicating this updated information to every user or every checking apparatus. The respective current certificate path positive list is merely requested from the positive path server when required.

A second aspect of embodiments of the present invention relate to a system for validating a digital user certificate of a user by a checking apparatus, wherein the user certificate is protected by a digital signature using an issuer key of an issuing authority issuing the user certificate, and a certificate path is a chain of certificates each confirming the signature of the preceding certificate, comprising in each case a user, a checking apparatus, a positive path server and an issuing authority, which are designed to perform the described method.

Such a system can be an automation installation having for example field devices as user apparatus and checking apparatus. The field devices, a positive path server and an issuing authority cooperate using the described method.

A third aspect of embodiments of the invention relate to a user apparatus having a digital user certificate, wherein the user certificate is protected by a digital signature using an issuer key of an issuing authority issuing the user certificate, and a certificate path is a chain of certificates each confirming the signature of the preceding certificate, which user apparatus is designed to perform the previously described method.

A fourth aspect of embodiments of the invention relate to a positive path server for providing certificate path information for validating a digital user certificate of a user, wherein the user certificate is protected by a digital signature using an issuer key of an issuing authority issuing the user certificate, and a certificate path is a chain of certificates each confirming the signature of the preceding certificate, which positive path server is designed to perform the previously described method.

The positive path server can be in software or hardware form. The positive path server can in particular be implemented in a manner integrated in an issuing authority or in the form of a server that is designed to be separate from the issuing authority, for example centrally in the form of a backend server.

A fifth aspect of embodiments of the invention relate to a computer program product (non-transitory computer readable storage medium having instructions, which when executed by a processor, perform actions) that can be loaded directly into a memory of a digital computer, comprising program code parts suitable for carrying out the steps of the previously described method.

Unless indicated otherwise in the description below, the terms "receive", "check", "confirm", "provide" relate to actions and/or processes and/or processing steps that alter and/or generate data and/or that convert data into other data, the data being able to be presented or available as physical variables, in particular, for example as electrical impulses. The user or the user apparatus, the checking apparatus, the positive path server and the issuing authority comprise at least one processor. Within the context of embodiments of the invention, a processor can be understood to mean an apparatus or an electronic circuit, for example. A processor can in particular be a main processor, a microprocessor or a microcontroller, possibly in combination with a memory unit for storing program instructions, etc. A user, a checking unit, a positive path server and an issuing authority can each be implemented in hardware and/or in software. When implemented in hardware, the respective unit can be in the form of an apparatus or in the form of part of an apparatus, for example in the form of a computer or in the form of a microprocessor or in the form of a control computer. When implemented in software, the unit can be in the form of a computer program product, in the form of a function, in the form of a routine, in the form of part of a program code or in the form of an executable object.

A computer program product, such as for example a computer program means, can be provided or delivered for example as a storage medium, such as for example a memory card, a USB stick, a CD-ROM, a DVD or in the form of a downloadable file from a server in a network.

BRIEF DESCRIPTION

Some of the embodiments will be described in detail, with reference to the following figures, wherein like designations denote like members, wherein.

DETAILED DESCRIPTION

Figure 1:
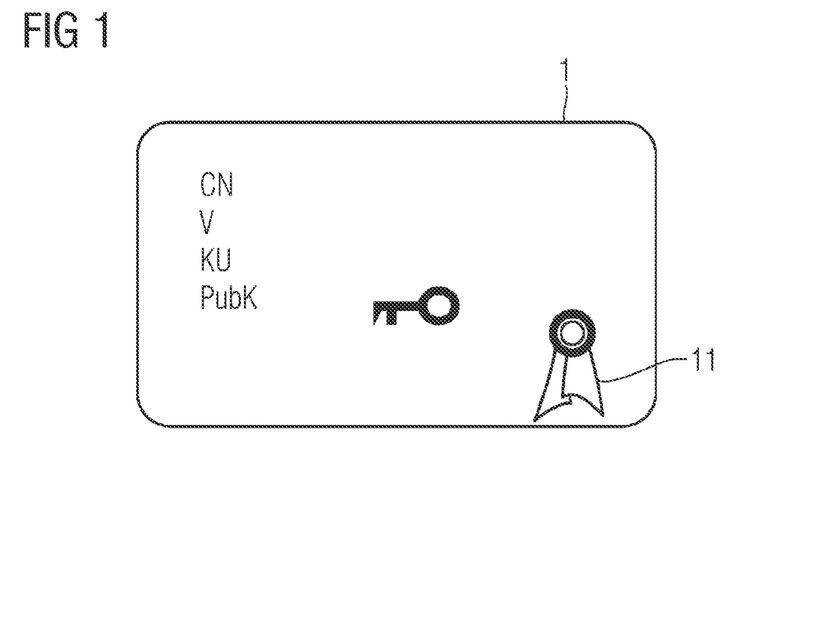
FIG. 1 shows a schematic depiction of an example of a digital certificate.

FIG. 1 shows the basic structure of a digital certificate 1, for example based on ITU-T standard X.509. A digital certificate 1 of this kind is required in an asymmetric cryptosystem, for example for authenticating a user by a checking apparatus. The digital certificate 1 comprises, among other things, a public key PubK of the user of the certificate 1, which is also additionally depicted by a key symbol. The digital certificate 1 is itself protected by a digital signature 11, the genuineness of which can be checked using the public key of the issuing authority for the certificate 1. The public key of an issuing authority is subsequently referred to as issuer key.

The certificate 1 moreover comprises a general name CN of the user, which identifies a user for which the certificate was issued. This can be indicated for example by its name, its e-mail address, its IP address, etc. In the case of device certificates, the manufacturer, the device type and/or the serial number of the device can be entered as general name. It is also possible for a projected device name or a pseudonym to be entered as general name. Moreover, the certificate 1 comprises details relating to the validity period V and relating to the permissible scope of application and validity.

In order to check the authenticity of the issuer key that was used to generate the digital signature 11, a digital certificate is again required. In this way, it is possible for a chain of digital certificates to be set up that each confirm the authenticity of the public key that can be used to check the preceding certificate. Such a chain of certificates is referred to as a certificate path. The communication partners without a further certificate must rely on the genuineness of the last certificate, which is referred to as the root certificate. There are moreover also self-signed certificates. Such a self-signed certificate is signed by the owner itself, that is to say that the signature of the certificate will be checked by the public key PubK contained in the certificate. A root certificate of an issuing authority is likewise normally a self-signed certificate.

Figure 2:
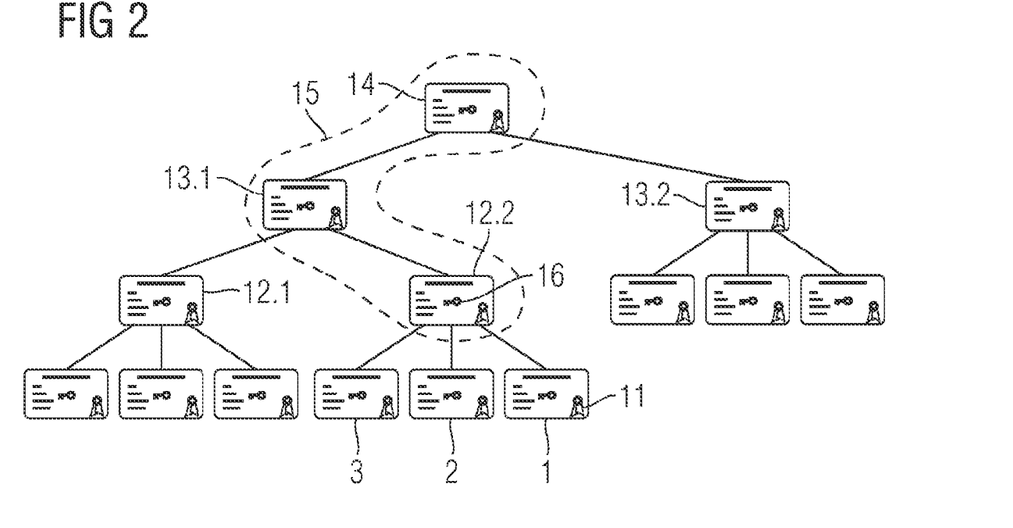
FIG. 2 shows a schematic depiction of an example of a certificate path.

FIG. 2 shows an example of a certificate hierarchy with a root certificate 14, multiple certificates 13.1, 13.2 from subsidiary issuing authorities. Additionally, certificates from further subsidiary issuing authorities 12.1 and 12.2 of the subsidiary issuing authority with the certificate 13.1 are depicted.

The certificate path 15 can be coded by a list of certificates 12.2, 13.1 and 14. According to embodiments of the invention, it is possible to form the certificate path 15 by specifying a hash value of a certificate or specifying the serial number and the issuer of the respective certificate instead of the certificate itself. A certificate path 15 can be assigned supplementary information. As such, criteria for the use of the user certificates 1, 2, 3 can be defined, for example whether a device having a device certificate that can be checked using this certificate chain 15 can be used for safety-critical control tasks.

According to embodiments of the invention, information concerning which certificate paths are permissible at a specific time or at present is now published. Permissible certificate paths are therefore provided to a checking apparatus wishing to check the certificate of a user.

Figure 3:
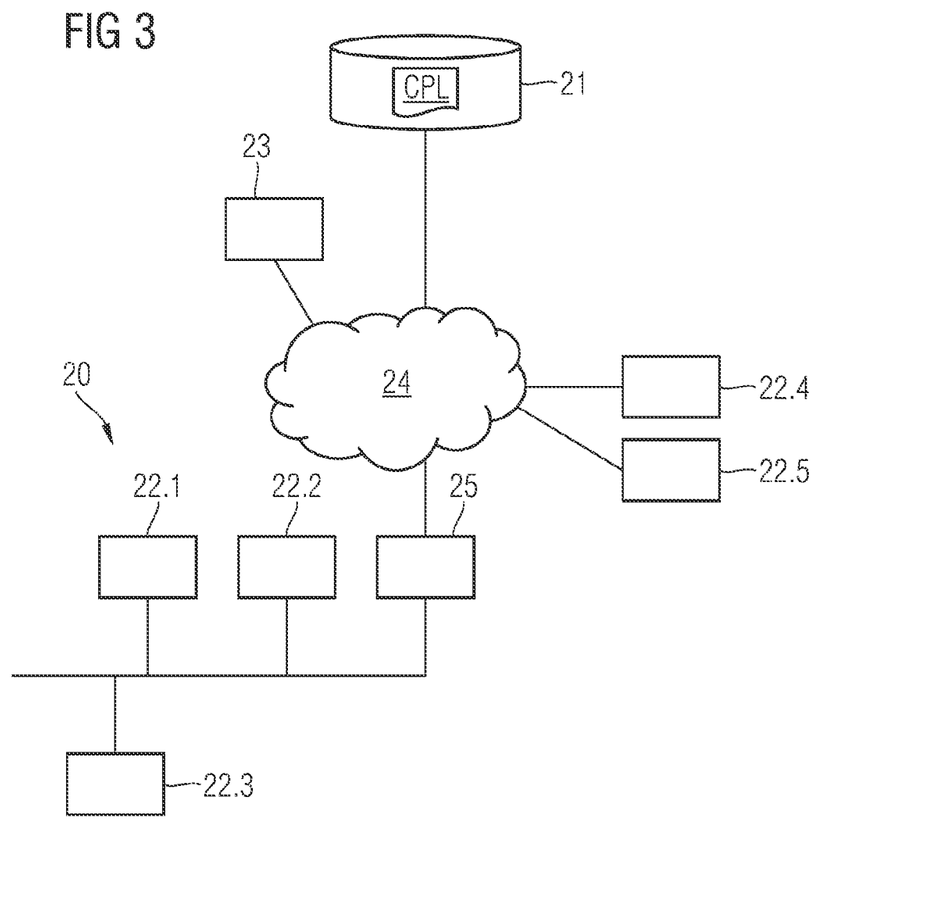
FIG. 3 shows a schematic depiction of an exemplary embodiment of a system in an application scenario.

FIG. 3 shows an exemplary embodiment of a system according to the invention using the example of an automation network 20. However, the components of the system can also be nodes in a communication network used elsewhere that uses a public key infrastructure as asymmetric cryptosystem. The automation network 20 comprises multiple users, for example field devices 22.1, 22.2, 22.3, 22.4, 22.5. The field devices 22.1 to 22.3 are connected to the other field devices 22.4 and 22.5 and also an issuing authority 23 and a positive path server 21 via a gateway 25 to a public transmission network 24, for example an Internet protocol network. The issuing authority 23 in this example has issued user certificates for the field devices or user apparatuses 22.1 to 22.5 and has signed them using its private key, for example the issuer key 16 from FIG. 2.

The positive path server 21 comprises at least one certificate path positive list CPL containing valid certificate paths 15 for the certificates issued by the issuing authority 23. If for example the field device 22.1 wishes to communicate with the field device 22.2 then the field device 22.1, which assumes the role of the user here, is authenticated by virtue of the field device 22.2, which assumes the role of the checking apparatus, performing a check in order to validate the authenticity of the field device 22.1. The user certificate of the user 22.1 is protected by a signature using the issuer key of the issuing authority 23.

Figure 4:
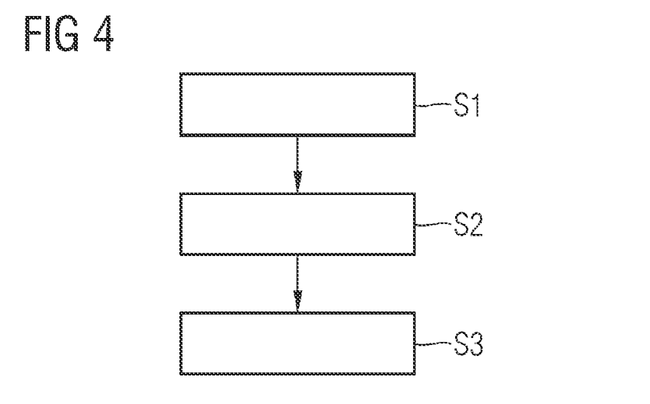
FIG. 4 shows an exemplary embodiment of the method in the form of a flowchart.

The flowchart in FIG. 4 is now used to describe the method according embodiments of the invention in more detail.

In a first method step S1, the checking apparatus 22.2 receives the user certificate of the user/field device 22.1. In method step S2, the checking apparatus 22.2 checks the user certificate on the basis of a certificate path positive list CPL that comprises at least one valid certificate path and was provided to the checking apparatus 22.2 by at least one positive path server 21. In method step S3, the validity of the user certificate is confirmed only if the digital signature and the issuer key of the user certificate of the user 22.1 are traceable to a root certificate on the basis of one of the valid certificate paths on the certificate path positive list.

The certificate path positive list CPL is protected by a cryptographic function. The certificate path server 21 is used to store the certificate path positive list in cryptographically protected form also. Advantageously, a certificate path positive list is digitally signed and thereby protected against manipulation. In addition, a cryptographic message authentication code can be created for the certificate path positive list and provided for checking. The certificate path positive list CPL can be transmitted to the checking apparatus 22.2 by way of a cryptographically protected communication connection, for example by a communication connection that has been set up using the transport layer security protocol TLS.

In addition, the certificate path positive list CPL can be updated on the basis of predefined criteria and provided to the checking apparatus 22.2 by the at least one positive path server 21.

A certificate path positive list CPL can be issued at different times. It can be provided to the checking apparatus 22.1 at stipulated times, for example daily, weekly, monthly or annually. It can, however, also be provided by the issuing authority 23 or by the positive path server 21 after a predefined number of user certificates have been issued, for example after 100 000 issued certificates. The certificate path positive list CPL can be provided again when the certificate 12.2 from a subsidiary issuing authority is revoked, changed or renewed or when one of the certificates 13.1 from a further subsidiary issuing authority on the way to the root certificate 14 is revoked, changed or renewed, see FIG. 2.

Figure 5:
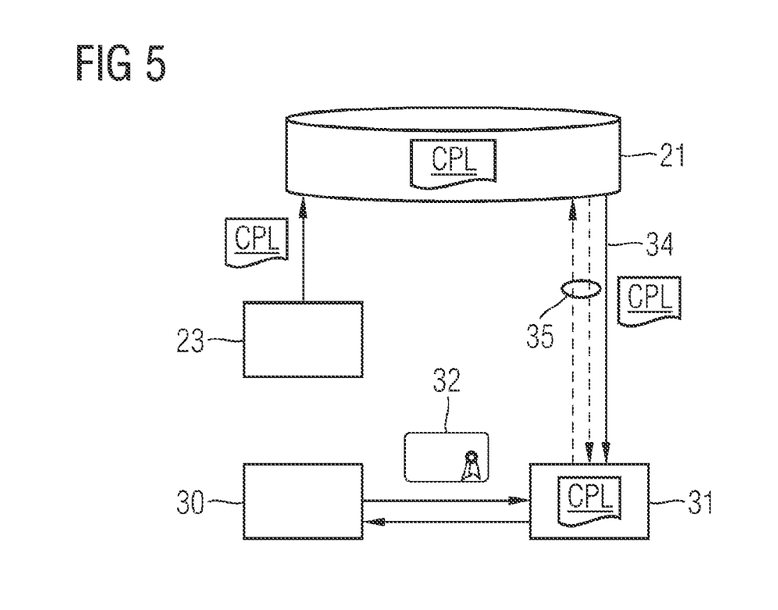
FIG. 5 shows a schematic depiction of a second exemplary embodiment of a system.

FIG. 5 shows a detailed view of a variant for how a certificate path positive list CPL is provided to the checking apparatus 31 by the positive path server 21 or the issuing authority 23.

The issuing authority 23 and the positive path server 21 can be in the form of an integrated unit or can be in the form of two separate physically isolated units, as depicted in FIG. 5.

The certificate path positive list CPL is first provided by the positive path server 21 when the checking apparatus 31 is started up and subsequently on the basis of further criteria. By way of example, the certificate path positive list CPL is provided to the positive path server 21 by the issuing authority 23. The issuing authority 23 can prompt this itself and, for example after a predefined time, can transmit the certificate path list CPL to the positive path server 21. The positive path server 21 can also actively request the certificate path positive list from the issuing authority 23, however.

The certificate path positive list CPL can be transmitted from the positive path server 21 to the checking apparatus 31 in a manner protected in a protected communication connection, see 35. This can be performed within a web service, that is to say a publicly accessible service. The certificate path positive list CPL can also be published as a transaction of a blockchain infrastructure, however. This applies both to the transfer of the certificate path positive list CPL between the issuing authority 23 and the positive path server 21 and to the transfer between the positive path server 21 and the checking unit 31.

The certificate path positive list CPL can also be compiled by the positive path server 21 itself. In this case, the certificate path positive list CPL is in particular trained by the positive path server 21 on the basis of a specific event or on the basis of a specific time. The time or an event can be the startup of an automation system or the maintenance thereof, for example. The certificate paths that arise, are required and in particular are deemed permissible are ascertained by the positive path server 21, for example by way of a configuration server, and an appropriate certificate path positive list is created therefrom by the positive path server 21. The at least one positive path server 21 therefore requests the certificate paths that are valid for the user certificates of a user 30.

Specific certificate paths can be marked as specifically trusted certificate paths. When a trusted certificate path of this kind is used, this is depicted on a user interface, for example by a predetermined different color or different font. In another variant, critical functions, in particular a cloud-based control or monitoring function of a technical system, such as autonomous vehicles, robots or control systems of a process automation, of a production automation, of a rail automation or of a power grid automation, can accept only certificate paths that are contained in a certificate path positive list CPL intended for this application. If the user 30 transmits its user certificate 32 to the checking apparatus 31, the certificate can be checked on the basis of the valid certification paths in the certificate path positive list CPL stored in the checking apparatus 31, for example. The user 30 can therefore be a device or apparatus of simple design, with little complexity.

Alternatively, the issuing of a user certificate 33 can involve information about the certificate path, in particular the certificate path list CPL, being coded into the certificate and being transmitted to the checking apparatus 31 with the user certificate 33. This is explained more precisely below on the basis of FIG. 6.

A device can perform multiple functions or classes of functions, e.g. control and maintenance/diagnosis. Different certificate path positive lists CPL can be used for different functions or classes of functions. In another variant, a device examines a user certificate in accordance with the certificate path positive list if there is a certificate path positive list configured on the device and/or if the user certificate comprises a certificate path positive list. Otherwise, conventional certificate path validation can take place for the user certificate, or the user certificate can be rejected as invalid. Furthermore, it is possible for conventional certificate path validation to take place, and additionally for an examination to be performed to determine whether the certificate path is permissible based on a certificate path positive list. By way of example, an implementation of a security protocol such as TLS (e.g. OpenSSL) can carry out conventional certificate path validation, and the application that uses the implementation of the security protocol can additionally carry out an examination against a certificate path positive list.

Figure 6:
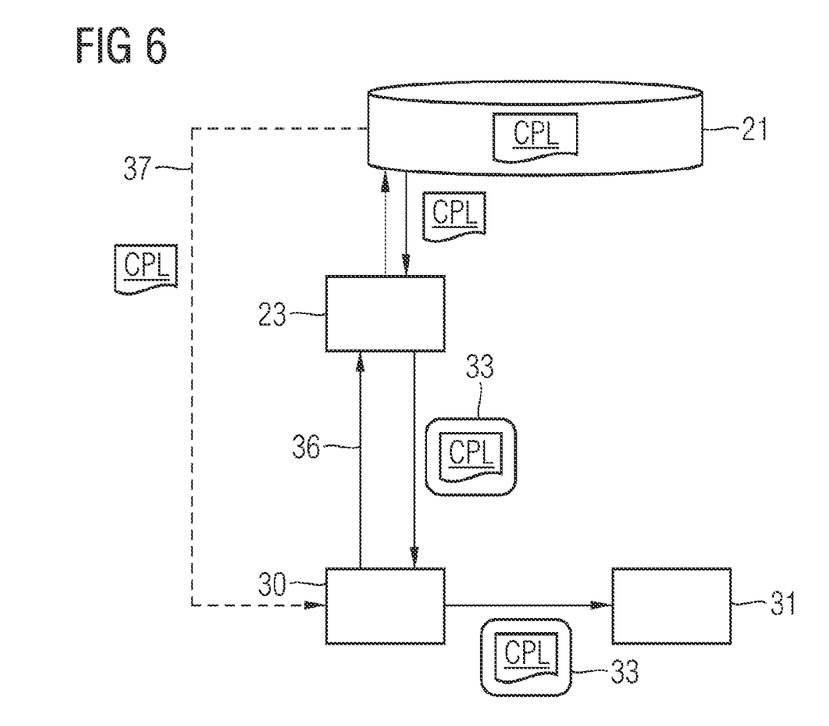
FIG. 6 shows a schematic depiction of a third exemplary embodiment of a system.

FIG. 6 shows a system according to embodiments of the invention with the checking apparatus 31 and the positive path server 21 and also the user 30. The user 30 uses a certificate request message 36, for example, to request a user certificate for itself from the issuing authority 23. On the basis of user information in the certificate request message 36, the issuing authority 23 requests a certificate path positive list CPL for this user 30 from the positive path server 21. The certificate path positive list CPL transmitted by the positive path server 21 is received by the issuing authority 23 and incorporated into the requested certificate, for example coded in as a certificate attribute or as a certificate extension. The certificate 33 with the integrated certificate path positive list CPL is transmitted to the user 30 as a response to the certificate request message 36. The user 30 uses the digital certificate 33 to authenticate itself to a checking unit 31.

The digital certificate 33 with the certificate path positive list CPL contained therein is valid until the validity period of the certificate 33 has expired. If another changed certificate path positive list CPL is available during the validity period of the issued certificate, the issued digital certificate 33 can be revoked and a corresponding digital certificate with an updated certificate path positive list can be issued. The user certificate 33 is updated after a predefined period of time or on the basis of predefined events, for example, as already described. The user is then informed about the presence of an updated certificate path positive list by a notification, for example. The user 30 can then request an updated user certificate from the issuing authority 23, for example.

In one variant, the certificate path positive list CPL is not transmitted via the issuing authority 23 or when a certificate is requested, but rather, independently of this, is transferred from the positive path server 21 to the user 30 by way of a protected connection 37.

Independently of the variants depicted in FIGS. 5 and 6, the certificate path positive list CPL can comprise constraints for the use of a valid certificate path.

The certificate 32 in the scenario described in FIG. 5 comprises, in contrast to the user certificate 33 from FIG. 6, no information of its own about the certificate path positive list CPL. It merely contains the signature of the issuing authority 23, which is checked in the checking apparatus 31 on the basis of the certificate path positive list CPL available there. In the scenario depicted in FIG. 6, the user certificate 33 comprises the certificate path positive list CPL. The checking apparatus 31 requires no further information regarding certificates on the certificate path list and can therefore be a device with little complexity, or an apparatus with little complexity.

In the scenario shown in FIG. 6, the issuing of a user certificate 33 involves information about the certificate path being coded into the certificate path list CPL and therefore into the certificate. Advantageously, this information is incorporated as a certificate extension. This information can therefore be used both in a digital certificate based on ITU-T standard X.509, for example, and in an attribute certificate.

A valid certificate path can comprise all certificates beginning with the certificate from the issuing authority 23 or all certificates beginning with one from an issuing authority that is superordinate to the issuing authority, up to and including a root certificate. However, the certificate path can also comprise criteria that determine which certificate path is permissible. If a certificate path indicates not the issuing authority issuing the user certificate but rather the certificate path beginning with a subsequent issuing authority, then more or less different certificate paths can be permitted for checking. This is a new criterion for validating certificate paths.

The user certificate 33 itself explicitly indicates which certificate path(s) is/are permissible. The certificate path positive list CPL containing the valid certificate paths is therefore coded into the certificate itself. The certificate path positive list CPL can be specific to a specific user certificate. A certificate path positive list for a multiplicity of user certificates is, however, for example depending on the type of user 30 or depending on the location of the user 30 in a specific geographical region.

A user certificate 33 can comprise the certificate path positive list CPL that was available at the time of issue of the user certificate 33. Specific deviations from this certificate path positive list can be permissible depending on a local checking guideline in the checking apparatus 31.

The information about a certificate path positive list can be incorporated in the certificate extension of a public key certificate or in an attribute of an attribute certificate as follows: the ASN.1 type PkiPath::=SEQUENCE OF Certificate defined in the X.509 standard can be used to transport and incorporate the certificate path list directly. The complete certificate information can be incorporated in this case.

In one variant, a compressed certificate path list is transferred instead. This involves a hash value being ascertained for each certificate path, for example. These are transferred in the certificate path list CPL as a sequence of hash values for the certificate paths. In another variant, a hash value is ascertained for every single certificate in a certificate path, and a certificate path is transmitted as a combination or sequence of hash values in the certificate path positive list CPL. It is also possible for only a partial path or individual certificates in a certificate path to be transferred in abbreviated fashion.

Furthermore, it is possible to identify a certificate or a certificate path by other information, for example by indicating the issuer or the serial number of the certificate or certificate path. However, this requires accordingly available information in the checking apparatus 31.

The certificate path positive list CPL itself can also be transferred by a reference value for the certificate path positive list. These are resolved by way of the issuing authority 23 or the positive path server 21. By way of example, the reference value is transmitted to the issuing issuing authority 23 or the positive path server 21 and the applicable certificate path positive list is transmitted to the user 22 or the checking apparatus 31 from there.

The checking apparatus 31 validates a received user certificate 33 by checking the certificate path on the basis of the certificate paths contained in the certificate path list CPL and the criteria indicated therefor. If a certificate path positive list CPL is compressed, the checking apparatus 31 can check it using a locally configured certificate path. A user 30 can examine whether the user certificate 32, 33 used by it contains a certificate path list. If this is the case, protocols such as TLS or the IP security protocol IPsec can involve today's customary transfer of the certificate path as part of the protocol being dispensed with.

Figure 7:
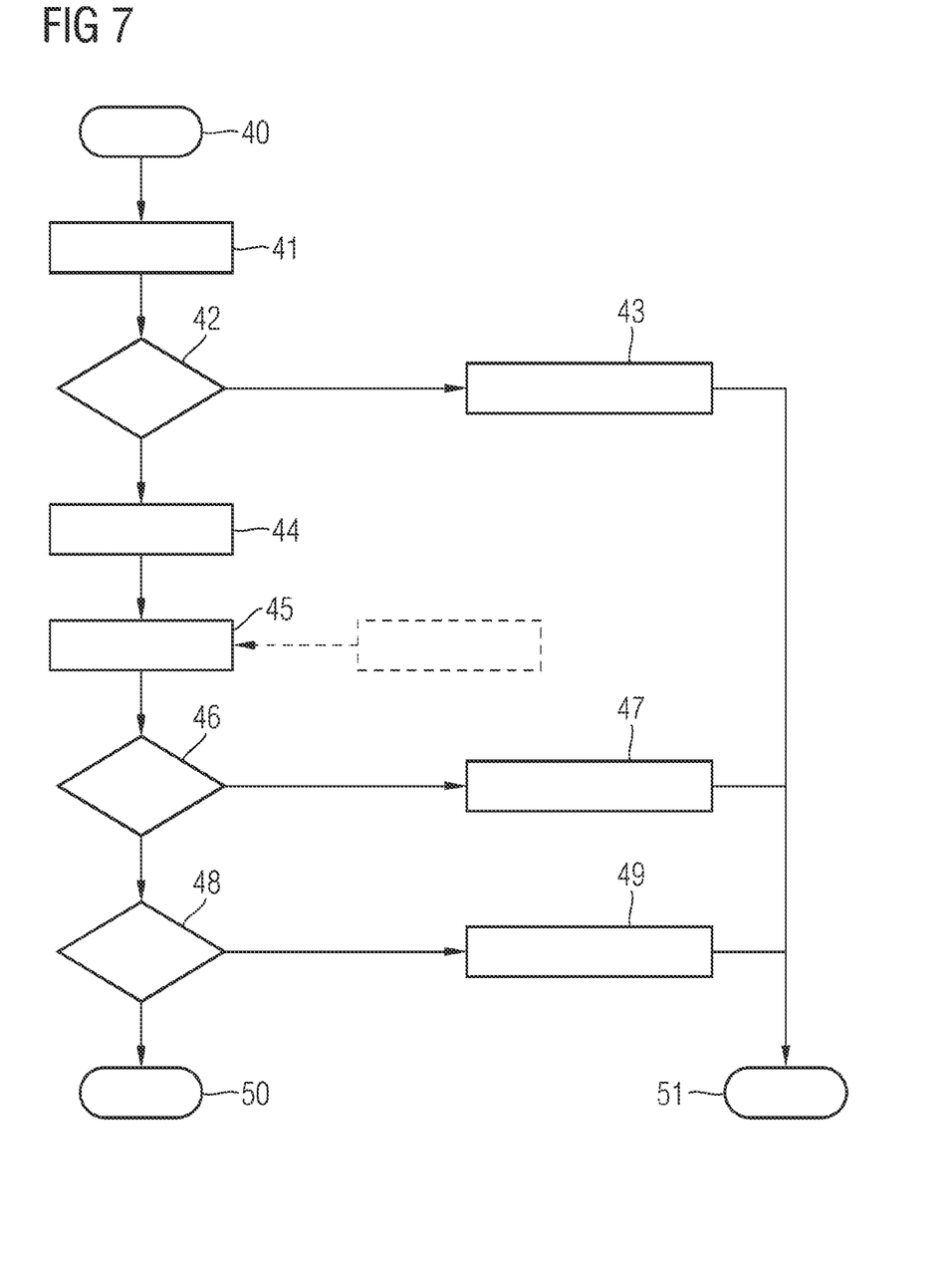
FIG. 7 shows an exemplary embodiment relating to the execution of a check on a user certificate available in compressed form in a checking apparatus in the form of a flowchart.

The checking of a user certificate 33 of a user 30 by a checking unit 31 is depicted in FIG. 7. In this case, the certificate 33 and the certificate path positive list CPL, or a certificate path 15 contained therein, are checked not within the context of a transport protocol but rather within the context of an application. The user 30 transfers compressed certificate paths, for example a reference value in the form of a fingerprint of its own certificate path, as part of the user certificate 33. In the checking unit 31, the user certificate 33 is, see initial state 40, and forwarded to the application, see step 41. The application can then use the certificate 33 with integrated information about the certificate path to validate the certificate. To that end, the certificate signature is checked in method step 42. If an error is found, an error report, see 43, is output. If the check is successful, a certificate path contained in the certificate in compressed form is read, see 44, and compared with a certificate path read from a memory, such as 45, in step 46. If the comparison or the check is successful, the message is processed further, see 48. If validation has failed, an error report 47 or 49 is output and the process is terminated, see 51.

A certificate path positive list can be used not only in a user certificate 1, 2, 3 but also in a certificate 12.2, 13.1 from the issuing authority 23 or from a further issuing authority in the certificate path 15, see FIG. 2. In principle, a root certificate can also comprise a certificate path positive list.

The transfer of the certificate path positive list in the user certificate allows the explicit transfer of this information to be dispensed with in the security protocol. This information is therefore always available to the checking apparatus 31, regardless of the protocol used. The lack of dependence on the actual security protocol, such as for example TLS, IPsec, allows the described approach to be easily used with existing communication infrastructures. The validation of a digital certificate is simplified if the certificate itself contains the information needed for validation. The compressed transfer of certificate path positive lists or of the certificate paths contained therein reduces the volume of data to be transferred. This is advantageous in particular for battery-operated Internet of Things devices or for narrowband radio transmission systems. Additionally, it can lead to faster connection setup, since the certificate already contains all the information.

The approach described can be implemented on a user apparatus or a checking apparatus and thus allows an efficient alternative to conventional certificate path validation. Similarly, the method can be used to have the certificate path validation carried out by a third, trusted node, for example if the checking apparatus has only a limited capacity. To this end, the known server-based certificate validation protocol SCVP (RFC 5055) in the request message could be extended as appropriate so as not only to allow the transfer of a certificate needing to be checked but also the option of checking only the certificate path on the certificate path positive list. As a result of embodiments of the invention, validation of the certificate paths is less susceptible to error, auditable and allows targeted control using permissible certificate paths. This means that it is in particular advantageous for critical industrial automation systems.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for validating a digital user certificate of a user by a checking apparatus, wherein the user certificate is protected by a digital signature using an issuer key of an issuing authority issuing the user certificate, and wherein a certificate path of the user certificate is a chain of certificates each confirming the signature of the preceding and including a root certificate, the method comprising:
   receiving the user certificate in the checking apparatus;
   receiving, in the checking apparatus, a certificate path positive list containing at least one complete certificate path identified as a valid certificate path, wherein the certificate path positive list is provided to the checking apparatus by at least one positive path server, a transmission service, or a transaction of a blockchain;
   checking the user certificate by performing one check of the complete certificate path of the user certificate as a whole against the certificate path positive list, such that the complete certificate path of the user certificate as a whole is compared with the complete valid certificate path as a whole contained in the certificate path positive list; and
   confirming the validity of the user certificate when the complete certificate path of the user certificate as a whole matches the complete valid certificate path as a whole contained in the certificate path positive list and the issuer key of the user certificate is traceable to the root certificate within the valid certificate path contained in the certificate path positive list.

2. The method as claimed in claim 1, wherein the certificate path positive list is protected by a cryptographic function.

3. The method as claimed in claim 1, wherein the certificate path positive list is updated on the basis of predefined criteria and is provided to the checking apparatus by the at least one positive path server.

4. The method as claimed in claim 1, wherein the at least one positive path server receives the certificate path positive list containing valid certificate paths for the certificates issued by the issuing authority.

5. The method as claimed in claim 1, wherein the at least one positive path server requests the certificate paths valid for user certificates of the user, and the positive path server generates the certificate path positive list comprising the valid certificate paths.

6. The method as claimed in claim 1, wherein the valid certificate path comprises all certificates beginning with a certificate from an issuing authority or all certificates beginning with one from a superordinate issuing authority, up to and including the root certificate.

7. The method as claimed in claim 1, wherein the certificate path positive list comprises constraints for the use of the valid certificate path.

8. The method as claimed in claim 1, wherein the certificate path positive list is inserted into the user certificate by the issuing authority when the user certificate is issued.

9. The method as claimed in claim 8, wherein the certificate path positive list is introduced into the user certificate as a certificate extension.

10. The method as claimed in claim 8, wherein the certificate path of the user certificate is introduced into the certificate path positive list in compressed form.

11. The method as claimed in claim 8, wherein a piece of reference information about the certificate path positive list is introduced into the user certificate.

12. A computer program product, comprising a computer readable hardware storage device having computer readable program code stored therein, said program code executable by a processor of a computer system to implement the method as claimed in claim 1.

13. The method as claimed in claim 1, wherein different certificate path positive lists are used for different functions or classes of functions.

14. A checking apparatus for validating a digital user certificate of a user, wherein the user certificate is protected by a digital signature using an issuer key of an issuing authority issuing the user certificate, and wherein a certificate path of the user certificate is a chain of certificates each confirming the signature of the preceding certificate up to and including a root certificate, which checking apparatus comprises a processor configured to perform a method comprising:
   receiving the user certificate in the checking apparatus;
   receiving, in the checking apparatus, a certificate path positive list containing at least one certificate path identified as a valid certificate path, wherein the certificate path positive list is received from at least one positive path server, from a transmission service, or from a transaction of a blockchain;
   checking the user certificate by one check of the complete certificate path of the user certificate against the certificate path positive list, such that the complete certificate path of the user certificate as a first single item is compared with the complete valid certificate path contained in the certificate path positive list as a second single item; and
   confirming the validity of the user certificate when the complete certificate path of the user certificate matches the complete valid certificate path contained in the certificate path positive list and the issuer key of the user certificate is traceable to the root certificate within the valid certificate path contained in the certificate path positive list.

15. The checking apparatus as claimed in claim 14, wherein different certificate path positive lists are used for different functions or classes of functions.

* * * * *